(12) United States Patent
Wang et al.

(10) Patent No.: US 12,367,560 B2
(45) Date of Patent: Jul. 22, 2025

(54) VIDEO TRANSMISSION METHOD, ELECTRONIC DEVICE AND COMPUTER READABLE MEDIUM

(71) Applicant: Beijing Bytedance Network Technology Co., Ltd., Beijing (CN)

(72) Inventors: Yujia Wang, Beijing (CN); Shu Liu, Beijing (CN); Gao Liu, Beijing (CN); Shu Tao, Beijing (CN); Jie Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/819,861

(22) Filed: Aug. 15, 2022

(65) Prior Publication Data
US 2022/0392026 A1     Dec. 8, 2022

Related U.S. Application Data

(63) Continuation of application No. PCT/CN2021/077743, filed on Feb. 24, 2021.

(30) Foreign Application Priority Data

Apr. 27, 2020    (CN) .......................... 202010345793.6

(51) Int. Cl.
*G06K 9/00*     (2022.01)
*G06T 5/00*     (2024.01)
(Continued)

(52) U.S. Cl.
CPC .................. *G06T 5/77* (2024.01); *G06T 5/50* (2013.01); *G06T 7/70* (2017.01); *G06V 20/46* (2022.01)

(58) Field of Classification Search
CPC .. G06T 5/005; G06T 5/50; G06T 7/70; G06V 20/46; H04N 21/44; H04N 21/8173
See application file for complete search history.

(56) References Cited

U.S. PATENT DOCUMENTS 5,999,979 A * 12/1999 Vellanki ............. H04N 21/8547
    348/E5.008
2002/0126142 A1* 9/2002 Hodgkinson .......... H04N 5/445
    348/E5.111
(Continued)

FOREIGN PATENT DOCUMENTS

| CN | 101179660 A | 5/2008 |
|---|---|---|
| CN | 102447873 A | 5/2012 |

(Continued)

OTHER PUBLICATIONS

Touil, Lamjed, Abdessalem Ben Abdelali, and Abdellatif Mtibaa. "Multi-video processing applications on FPGA." Int. J. Advanced Media and Communication 5.4 (2015): 245-259 (Year: 2015).*

(Continued)

*Primary Examiner* — Sean M Conner
(74) *Attorney, Agent, or Firm* — Astute IP Law Group

(57) ABSTRACT

The present disclosure relates to a video transmission method, an electronic device and a computer readable medium. The method is applied to a first application installed in a first terminal, where the first terminal is further installed with a second application. The method includes: acquiring a current video frame; performing special effect processing on the current video frame according to a received special effect setting instruction, and generating a target video frame; and sending the target video frame to the second application. Thus, the first application can be matched with any second application that needs to use a special effect processing function, and the second applica- (Continued)

tion can be enabled to obtain a special effect-processed video on the premise that the second application does not need to be redeveloped.

20 Claims, 5 Drawing Sheets

(51) Int. Cl.
*G06T 5/50* (2006.01)
*G06T 5/77* (2024.01)
*G06T 7/70* (2017.01)
*G06V 20/40* (2022.01)

(56) References Cited

U.S. PATENT DOCUMENTS

| | | | |
|---|---|---|---|
| 2003/0079008 A1* | 4/2003 | Fujii | H04L 65/764 |
| | | | 348/E7.071 |
| 2006/0050155 A1* | 3/2006 | Ing | G06F 9/544 |
| | | | 348/E7.087 |
| 2007/0074115 A1* | 3/2007 | Patten | G11B 27/032 |
| 2008/0117974 A1* | 5/2008 | Ramachandran | H04N 19/176 |
| | | | 375/E7.104 |
| 2010/0162092 A1 | 6/2010 | Albu et al. | |
| 2012/0117472 A1* | 5/2012 | Su | G11B 27/034 |
| | | | 715/719 |
| 2015/0208001 A1* | 7/2015 | Kaneko | H04N 23/673 |
| | | | 348/239 |
| 2016/0094648 A1* | 3/2016 | Han | H04W 76/10 |
| | | | 709/209 |
| 2017/0332020 A1* | 11/2017 | Ouyang | H04N 19/176 |
| | | | 375/E7.104 |
| 2018/0300037 A1* | 10/2018 | Takeda | G06F 13/00 |
| 2019/0288973 A1 | 9/2019 | Liu et al. | |
| 2020/0074738 A1* | 3/2020 | Hare | G06F 3/04845 |
| 2021/0125342 A1* | 4/2021 | Li | G06V 40/23 |
| 2023/0012089 A1* | 1/2023 | Tang | H04N 21/4788 |

FOREIGN PATENT DOCUMENTS

| | | | | |
|---|---|---|---|---|
| CN | 105302534 A | | 2/2016 | |
| CN | 107396193 A | * | 11/2017 | ......... H04N 21/4126 |
| CN | 108762829 A | | 11/2018 | |
| CN | 108845861 A | | 11/2018 | |
| CN | 109379623 A | | 2/2019 | |
| CN | 110012352 A | | 7/2019 | |
| CN | 111565332 A | | 8/2020 | |

OTHER PUBLICATIONS

International Search Report for International Patent Application No. PCT/CN2021/077743, mailed May 28, 2021 (17 pages).
Decision on Rejection for Chinese Patent Application No. 2020103457936, dated May 7, 2022 (6 pages).
First Office Action for Chinese Patent Application No. 2020103457936, dated Sep. 17, 2021 (11 pages).
Second Office Action for Chinese Patent Application No. 2020103457936, dated Feb. 25, 2022 (8 pages).

* cited by examiner

VIDEO TRANSMISSION METHOD, ELECTRONIC DEVICE AND COMPUTER READABLE MEDIUM

CROSS-REFERENCE TO RELATED APPLICATIONS

This application is a continuation of International Application No. PCT/CN2021/077743, filed on Feb. 24, 2021, which claims priority to Chinese Patent Application No. 202010345793.6, filed on Apr. 27, 2020. The disclosures of the aforementioned applications are hereby incorporated by reference in their entireties.

TECHNICAL FIELD

The present disclosure relates to the field of video technology and, in particular, to a video transmission method, an electronic device, and a computer readable medium.

BACKGROUND

At present, many video applications are integrated with special effect processing functions and video playback functions, so that this video application can support special effect processing of a video image, and can play a special effect processed video, so as to meet user's needs. Among them, a special effect refers to a special effect realized by computer software. For example, beautifying and deforming a character in a video screen; blurring and replacing background of the character in the video screen; and adding a sticker, filtering the character in the video and so on.

However, in related technologies, if a user wants to enable an application that does not have a special effect processing function to realize special effect processing, the only way is that developers redevelop the application. In this way, not only the development workload is heavy and the development difficulty is increased, but also, for the user, the special effect processing function cannot be used immediately, resulting in poor user experience

SUMMARY

This Summary section is provided to introduce concepts in a simplified form, which will be described in detail in the Description of Embodiments section that follows. This Summary section is not intended to identify key features or essential features of the claimed technical solution, and not intended to be used to limit the scope of the claimed technical solution either.

In a first aspect, the present disclosure provides a video transmission method, applied to a first application installed in a first terminal, where the first terminal is further installed with a second application. The method includes: acquiring a current video frame; performing special effect processing on the current video frame according to a received special effect setting instruction, and generating a target video frame; and sending the target video frame to the second application.

In a second aspect, the present disclosure provides a video transmission method, applied to a virtual device in a first terminal, where the first terminal is installed with a first application and a second application. The method includes: acquiring multiple subframes sent by the first application, where the first application is used to decompose a target video frame into multiple subframes; combining the multiple subframes to obtain the target video frame; and sending the target video frame to the second application, where the target video frame is generated by the first application performing special effect processing on a current video frame according to a received special effect setting instruction.

In a third aspect, the present disclosure provides an electronic device, including: a storage apparatus and a processing apparatus, where a computer program is stored in the storage apparatus; and the processing apparatus is configured to execute the computer program in the storage apparatus to implement steps of the video transmission method provided by the present disclosure.

In a fourth aspect, the present disclosure provides a computer readable medium, where the medium stores a computer program which, when executed by a processing apparatus, implements steps of the video transmission method provided by the present disclosure.

In a fifth aspect, the present disclosure provides a computer program product, including: a computer program, where the computer program is stored in a readable storage medium, and at least one processor of an electronic device can read the computer program from the readable storage medium, and the at least one processor executes the computer program, so that the electronic device executes steps of the video transmission method provided by the present disclosure.

In a sixth aspect, the present disclosure provides a computer program, where the computer program is stored in a readable storage medium, at least one processor of an electronic device can read the computer program from the readable storage medium, and the at least one processor executes the computer program, so that the electronic device executes steps of the video transmission method provided by the present disclosure.

In the above technical solution, the special effect processing is realized by the first application, and the video frame obtained after special effect processing is provided to the second application through the first application, so as to meet the requirement of the second application to use the special effect processing function. Through the above technical solutions provided in the present disclosure, the first application can be matched with any second application that needs to use a special effect processing function, and the second application can be enabled to obtain a special effect-processed video on the premise that the second application does not need to be redeveloped. In this way, not only the development difficulty and the development cost can be reduced, but also, for a user, the special effect processing can be achieved on the second application only by installing the first application. It is quite convenient and fast to use, and the user experience is improved.

Other features and advantages of the present disclosure will be described in detail in the Description of Embodiments section that follows.

BRIEF DESCRIPTION OF DRAWINGS

The above and other features, advantages and aspects of the embodiments of the present disclosure will become more apparent in conjunction with the accompanying drawings and with reference to the following detailed implementations. Throughout the drawings, the same or similar reference numbers refer to the same or similar elements. It should be understood that the drawings are schematic and that the devices and elements are not necessarily drawn to scale. In the accompanying drawings.

DESCRIPTION OF EMBODIMENTS

Figure 1:
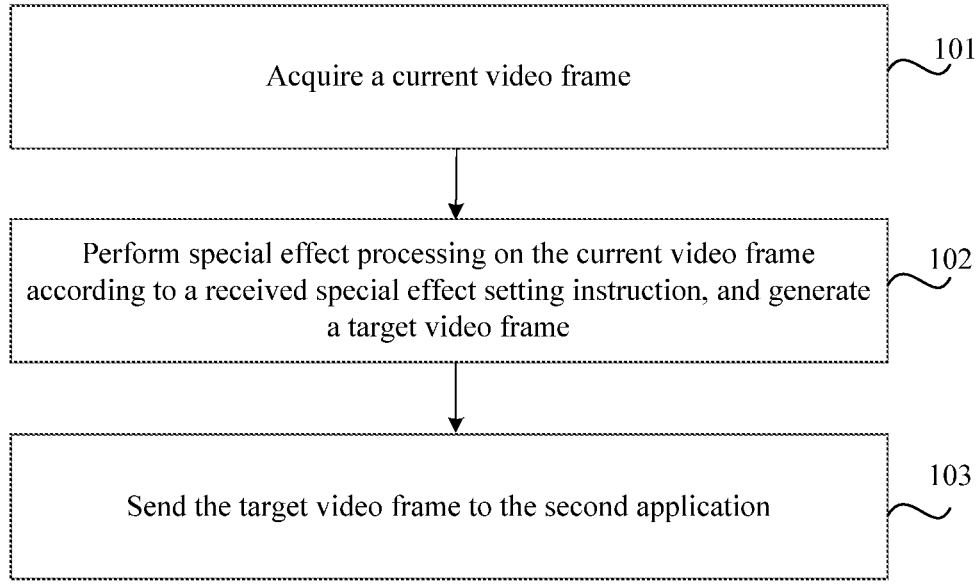
FIG. 1 is a flowchart of a video transmission method according to an exemplary embodiment.

Embodiments of the present disclosure will be described in more detail below with reference to the drawings. While certain embodiments of the present disclosure are shown in the drawings, it should be understood that the present disclosure may be embodied in various forms and should not be interpreted as being limited to the embodiments set forth herein, rather, these embodiments are provided for the purpose of a more thorough and complete understanding of the present disclosure. It should be understood that the drawings and the embodiments of the present disclosure are only for exemplary purposes, and are not used to limit the protection scope of the present disclosure.

It should be understood that the respective steps described in method embodiments of the present disclosure may be performed in a different order, and/or performed in parallel. Further, the method embodiments may include additional steps and/or omit performing the illustrated steps. The scope of the present disclosure is not limited in this regard.

The term "including" and variations thereof used herein are open-ended inclusions, that is, "including but not limited to". The term "based on" means "at least partially based on"; the term "an embodiment" means "at least one embodiment"; the term "another embodiment" means "at least one of other embodiments"; and the term "some embodiments" means "at least some embodiments". Relevant definitions of other terms will be given in the description below.

It should be noted that concepts such as "first" and "second" mentioned in the present disclosure are only used to distinguish different apparatuses, modules or units, and are not used to limit a sequence or a relation of interdependence of functions performed by these apparatuses, modules or units.

It should be noted that modifications of "a" and "multiple" mentioned in the present disclosure are illustrative rather than restrictive, and should be understood as "one or more" by those skilled in the art, unless otherwise expressly indicated in the context.

Names of messages or information exchanged between multiple apparatuses in the implementations of the present disclosure are only for illustrative purposes, and are not intended to limit the scope of these messages or information.

FIG. 1 is a flowchart of a video transmission method according to an exemplary embodiment. The video transmission method can be applied to a first application installed in a first terminal. The first terminal is further installed with a second application. As shown in FIG. 1, the method may include S101 to S103.

In S101, acquire a current video frame.

In the present disclosure, the first application may include an application having video effect processing capabilities. Exemplarily, the first application may include an application dedicated to video special effect processing. The second application is different from the first application in the first terminal. Exemplarily, the second application may be any one of the following: an application applied for a video call, an application applied for a short video, an application applied for a live broadcast, an application applied for a teleconference, an application applied for a social, etc.

The first terminal may be any type of terminal device, including but not limited to: a smart phone, a tablet computer, a personal digital assistant, a notebook computer, a desktop computer, a wearable electronic device, etc.

In this disclosure, firstly, the first application acquires the current video frame. The first application may take a video frame captured by an image acquisition apparatus as the current video frame. The image acquisition apparatus may be disposed on the first terminal, or the image acquisition apparatus may be separated from the first terminal, which is not limited in the present disclosure. The image acquisition apparatus may be any form of apparatus having video acquisition capabilities. Exemplarily, the image acquisition apparatus may be a camera, or an electronic device installed with a camera and so on. In one embodiment, the first application may also acquire a video frame processed by another application as the current video frame, which is not limited in the present disclosure.

In S102, perform special effect processing on the current video frame according to a received special effect setting instruction, and generate a target video frame.

The target video frame is a special effect-processed video frame. For example, the first application may superimpose the "beauty" special effect on the current video frame, and generate a target video frame processed by the "beauty" special effect, if the special effect setting instruction instructs that the user applies a "beauty" special effect setting operation. For example, the first application may superimpose the "beauty" special effect with the target object in the current video frame, and generate the target video frame processed by the "beauty" special effect.

In S103, send the target video frame to the second application. Thus, the second application can obtain the target video frame obtained after special effect processing.

Exemplarily, the description will be made by taking an application in which the second application as a video call application as an example. After the user enables the video call function of the second application and runs the first application, the user can perform special effect setting operations on a human-computer interaction interface provided by the first application. Correspondingly, the first application may receive the special effect setting instruction, perform special effect processing on the current video frame according to the special effect setting instruction, and send the target video frame obtained after the special effect processing to the second application. The second application can obtain the special effect-processed target video frame. Afterwards, the second application may further process the special effect-processed target video frame, for example, transmit it to the other end of the call.

For another example, the description will be made by taking an application in which the second application is a teleconference application as an example. After joining or initiating a conference through the second application and runs the first application, the user can perform special effect setting operations on the human-computer interaction interface provided by the first application. Correspondingly, the first application may receive the special effect setting instruction, perform special effect processing on the current video frame according to the special effect setting instruction, and send the target video frame obtained after the special effect processing to the second application. The second application can obtain the special effect-processed target video frame, and then the second application can further process the special effect-processed target video frame, for example, transmit it to other terminals in the conference.

In the above technical solution, the special effect processing is realized by the first application, and the video frame obtained after special effect processing is provided to the second application through the first application, so as to meet the requirement of the second application to use the special effect processing function. Through the above technical solutions provided in the present disclosure, the first application can be matched with any second application that needs to use a special effect processing function, and the second application can be enabled to obtain a special effect-processed video on the premise that the second application does not need to be redeveloped. In this way, not only the development difficulty and the development cost can be reduced, but also, for a user, the special effect processing can be achieved on the second application only by installing the first application. It is quite convenient and fast to use, and the user experience is improved.

In order to realize the video transmission between the first application and the second application, a video transmission channel needs to be established between the first application and the second application. Please refer to FIG. 2, which is a schematic diagram of establishing a video transmission channel between a first application and a second application. The following describes the establishment process of the video transmission channel in detail with reference to FIG. 2.

Figure 2:
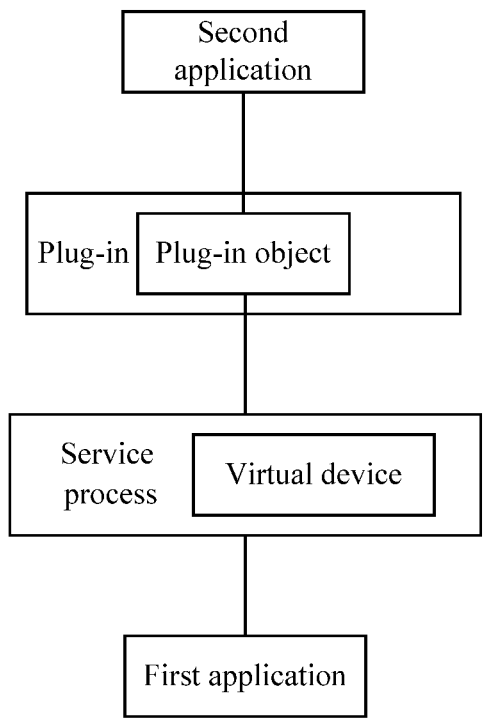
FIG. 2 is a schematic diagram of establishing a video transmission channel between a first application and a second application.

The virtual device in the video transmission channel can be triggered and set by the first application. As shown in FIG. 2, when the first application is installed on the first terminal, the first application will register a service process corresponding to the first application in the operating system of the first terminal, where the service process can be configured according to the first application. After that, when the first terminal is started, the operating system of the first terminal will call the service process to create the virtual device. For example, the virtual device can be created within the service process. After the first terminal creates the virtual device, the first application can send the generated target video frame to the virtual device, so that the virtual device can obtain the target video frame. Exemplarily, the first application and the virtual device may communicate through IPC (Inter-process Communication).

The virtual device can be understood as a virtual image acquisition apparatus, and the service process may be a process that serves the virtual image acquisition apparatus in the operating system. In this way, the first application can send the target video frame to the virtual image acquisition apparatus. When the second application needs to acquire a video, the video can be obtained by calling the image acquisition apparatus through the operating system, and the operating system can send the target video frame provided by the virtual image acquisition apparatus to the second application, so that the target video frame provided by the first application can be regarded as the video frame provided by the image acquisition apparatus to be provided to the second application. When the first application is installed on the first terminal, the first application will also create a plug-in corresponding to the first application. In this way, when the second application needs to establish a video transmission connection with the first application, the second application can, through loading the plug-in, create a plug-in object corresponding to the second application in the plug-in. An identifier of the corresponding second application (for example, the UUID (Universally Unique Identifier) of the second application) and the identifier of the service process (for example, a name of the service process) corresponding to the first application may be recorded in the plug-in object. In this way, video transmission between the second application and the virtual device can be implemented through the plug-in object.

Exemplarily, when the second application needs to acquire the target video frame generated by the first application, can send a video acquisition request to the service process corresponding to the first application. In response to the request, the virtual device in the service process can send the target video frame to the plug-in object corresponding to the second application that sends the video acquisition request, thereby sending the target video frame to the corresponding second application.

Figure 3:
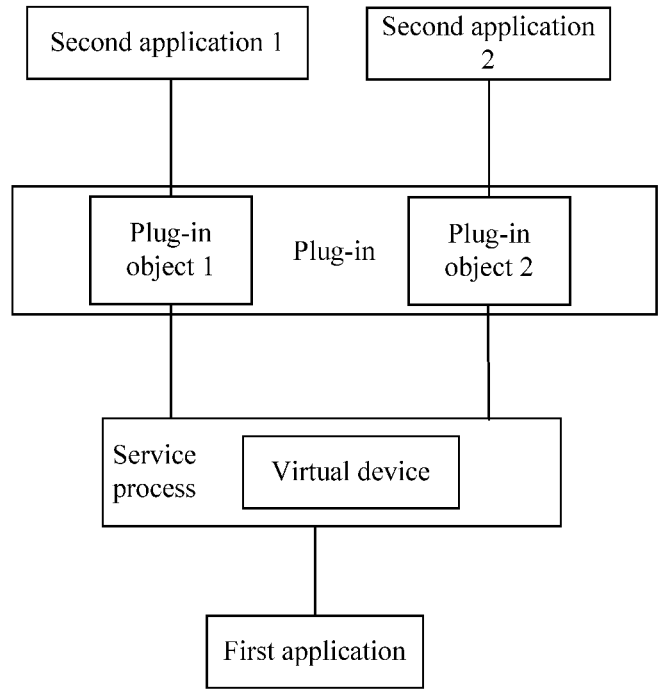
FIG. 3 is another schematic diagram of establishing a video transmission channel between the first application and the second application.

It should be noted that, in the above manner, video transmission channels can be respectively established between the first application and multiple different second applications on the first terminal. FIG. 3 is another schematic diagram of establishing a video transmission channel between the first application and the second application. As shown in FIG. 3, each second application (for example, the second application 1 and the second application 2 in FIG. 3; where the second application 1 and the second application 2 may be different applications) can create its corresponding plug-in object by loading the plug-in corresponding to the first application (plug-in object 1 and plug-in object 2 in FIG. 3). When both the second application 1 and the second application 2 need to obtain the target video frame generated by the first application, the second application 1 and the second application 2 can send the video acquiring request to the service process corresponding to the first application. In response to the request, the virtual device in the service process may send the target video frame to the plug-in objects corresponding to the second application 1 and the second application 2 respectively. In this way, the virtual device can distribute the target video frame to each plug-in object, and send the target video frame to the corresponding second application through each plug-in object.

For example, the second application 1 may be an application of a video call application, and the second application 2 may be an application of a remote conference application. The two second applications can establish a video transmission channel with the first application in the above manner, and then the first application can send the generated target video frames to the two second applications at the same time, so that the both of these two second applications can obtain the special effect-processed target video frame and proceed to the next step. For example, the second application 1 may transmit the target video frame to the call peer and/or the second application 2 may transmit the target video frame to other terminals in the conference. In this way, the first application can provide special effect processing services for multiple second applications at the same time.

It should be noted that, in FIG. 3, the first application sends the target video frame to two second applications (the second application 1 and the second application 2; where the second application 1 and the second application 2 may be different applications) for exemplary illustration, and the present disclosure does not limit the number and type of the second applications.

As mentioned above, it is a video frames that is transferred between applications. Since a size of the video frame is relatively large, in another embodiment of the present disclosure, in order to improve the transmission speed and reduce the memory occupation, the video frame may be decomposed first and then combined to realize the video frame transmission.

Exemplarily, the above first application sending the target video frame to the virtual device may further include: decomposing the target video frame into multiple subframes; storing the multiple subframes in a shared memory, so that the virtual device reads the multiple subframes from the shared memory. Where the virtual device may combine the multiple subframes read to obtain the target video frame and send the target video frame to the second application.

For example, the first application may decompose the target video frame into multiple subframes according to a preset subframe size, and make the size of each subframe not exceed the preset subframe size.

In an implementation, the first application may sequentially store the decomposed subframes in the shared memory in a preset order. Correspondingly, the virtual device also reads the multiple subframes from the shared memory in sequence according to the preset order, and combines the multiple subframes to obtain the target video frame. In this way, it can be ensured that the video frame combined by the virtual device is the target video frame.

Through the above solution, the first application can decompose a video frame with a relatively large video size into multiple subframes for transmission. The virtual device combines each subframe after acquiring it to restore a complete video frame. Thereby, the occupation of the shared memory can be reduced, and the video transmission rate can be improved.

In addition, the virtual device may also send the specified video frame to the second application when the virtual device does not obtain the multiple subframes decomposed from the target video frame sent by the first application. In an embodiment, when the multiple subframes sent by the first application are not acquired, the virtual device calculates whether the number of consecutive times that the multiple subframes are not obtained reaches the preset number of times. When the consecutive number of times is less than the preset number of times, the virtual device takes the target video frame obtained by the latest combination as the specified video frame, and sends it to the second application. When the number of consecutive times reaches the preset number of times, the preset video frame is used as the designated video frame, and is sent to the second application. The detailed operation of the virtual device will be described below with reference to FIG. 4.

In one embodiment, the second application may be an application with a video rendering capability. In this way, after receiving the target video frame, the second application can also render the target video frame, and displays the rendered target video frame in the video display interface of the second application.

In another embodiment, after receiving the target video frame, the second application may also send the target video frame to at least one second terminal in real time.

The first terminal can perform video transmission with at least one second terminal through the second application in the first terminal. For example, the second terminal may be a terminal that is conducting a video call with the first terminal, or the second terminal may also be a terminal that is watching a live broadcast, or the second terminal may also be a terminal that is participating in a video conference, which is not limited in the present disclosure.

After receiving the target video frame, the second application can send the target video frame to at least one second terminal in real time, so that the at least one second terminal can receive and display the target video frame through the second application. In this way, the user of the second terminal can watch the special effect-processed video picture sent by the first terminal.

In another embodiment, after receiving the target video frame, the second application may display the target video frame in the video display interface of the second application, and at the same time may send the target video frame to at least one first two terminal, so that the at least one second terminal receives and displays the target video frame through the second application.

Figure 4:
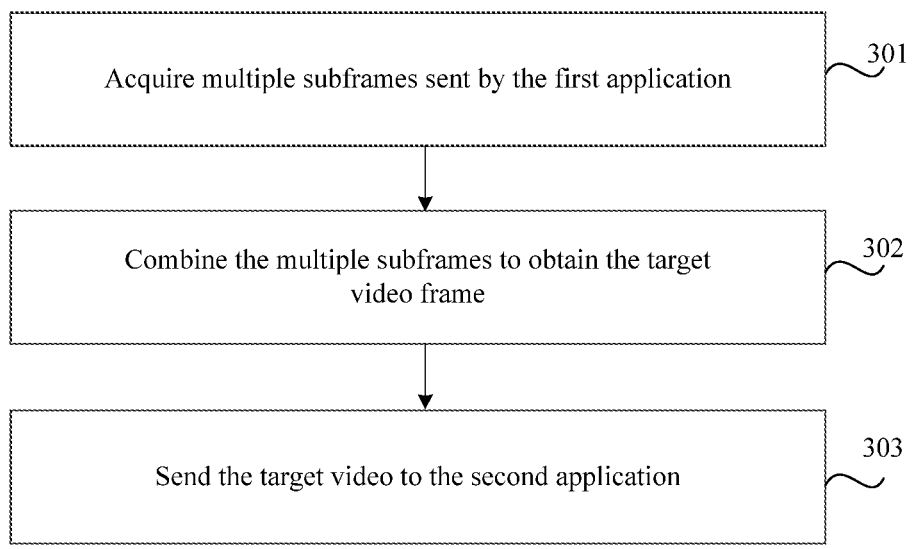
FIG. 4 is a flowchart of a video transmission method according to another exemplary embodiment.

FIG. 4 is a flowchart of a video transmission method according to another exemplary embodiment. The video transmission method can be applied to a virtual device in a first terminal, and the first terminal is installed with a first application and a second application. As shown in FIG. 4, the method may include S301~S303.

In S301, acquire multiple subframes sent by the first application, where the first application is used to decompose a target video frame into the multiple subframes.

In S302, combine the multiple subframes to obtain the target video frame.

In S303, send the target video frame to the second application, where the target video frame is generated by the first application performing special effect processing on a current video frame according to a received special effect setting instruction.

In an embodiment, the virtual device may be triggered and set by the first application. For example, when the first application is installed on the first terminal, the first application will register a service process corresponding to the first application in the operating system of the first terminal, and the service process can be configured according to the first application. After that, when the first terminal is started, the operating system of the first terminal will call the service process to create the virtual device. For example, the virtual device can be created within the service process.

The virtual device can be understood as a virtual image acquisition apparatus, and the service process can be a process in the operating system that serves the virtual image acquisition apparatus. In this way, the first application can send the target video frame to the virtual image acquisition apparatus. When the second application needs to acquire the video, the second application can call the image acquisition apparatus through the operating system to obtain the video, and the operating system can send the target video frame provided by the virtual image acquisition apparatus to the second application. Therefore, the target video frame provided by the first application can be regarded as the video frame provided by the image acquisition apparatus to be provided to the second application.

In an embodiment, the virtual device can send the target video frame to a plug-in object corresponding to the second application, so that the plug-in object can send the target video frame to the corresponding second application. Where the plug-in object is created by the plug-in corresponding to the first application loaded by the second application.

It should be noted that, the above virtual device and plug-in object can be created in the manner described above in conjunction with FIG. 2 and FIG. 3.

Through the above solution, the first application can decompose a video frame with a relatively large video size into multiple subframes for transmission. The virtual device combines each subframe after acquiring it to restore a complete video frame, thereby increasing the video transmission rate.

The specific manner of each step in the above embodiment has been described in detail in the foregoing embodiment, and will not be described in detail here.

In another embodiment of the present disclosure, the method shown in FIG. 4 may further include:

sending the specified video frame to the second application when the multiple subframes sent by the first application are not obtained.

The inventor found that, in actual operation, there may be the following situations: 1. since the special effect that need to be superimposed are relatively complex, the first application may take a long time to complete the special effect processing; 2. due to the abnormality of the image acquisition apparatus itself, it fails to continuously output video frames to the first application; and 3. the first application special effect processing fails and so on. In these cases, the video transmission between the first application and the virtual device may be interrupted, so that the virtual device may not be able to obtain the latest target video frame within a certain period of time, and thus cannot send the latest target video frame to the second application. At this time, it will cause the second application of displaying the target video frame and the terminal to appear screen flickering.

Thus, in an embodiment, the virtual device can receive and acquire multiple subframes decomposed from the target video frame sent by the first application in real time. If acquiring the multiple subframes decomposed from the target video frame sent by the first application, the virtual device combines multiple subframes to obtain a target video frame, and sends the target video frame to the second application. If the virtual device does not acquire the multiple subframes sent by the first application, it can send the specified video frame to the second application, thereby ensuring the continuous video transmission between the first application and the second application.

Exemplarily, when the multiple subframes sent by the first application are not obtained, the virtual device may calculate whether the number of consecutive times that the multiple subframes are not obtained reaches a preset number of times. When it is determined that the consecutive number of times is less than the preset number of times, the virtual device sends the latest combined target video frame as the specified video frame to the second application.

In an embodiment, through the preset number of times, maximum waiting time of the virtual device can be set. That is, if the virtual device does not obtain multiple subframes sent by the first application within the maximum waiting time, it will send the latest combined target video frame to the second application, thereby ensuring that the second application can continuously obtain the special effect-processed target video frame in real time, so as to avoid the occurrence of screen flickering.

When it is determined that the number of consecutive times reaches the preset number of times, the virtual device may send the preset video frame as the specified video frame to the second application. That is, if the waiting time has reached the maximum waiting time, and the virtual device has not acquired the multiple subframes newly sent by the first application, the virtual device can send the preset video frame to the second application. For example, the preset video frame may include a preset background image. In this way, it is convenient for the user to know that there is an abnormality in the special effect processing, so that the user can take corresponding solutions in time.

It is worth noting that both the latest combined target video frame by the virtual device and the above preset video frame can be cached in the virtual device. After successfully obtaining the target video frame, the virtual device can use the target video frame to replace the currently cached target video frame, to ensure that the target video frame cached in the virtual device is always the latest combined target video frame by the virtual device.

The special effect processing method used in the present disclosure is described below.

In the related technologies, when many video applications perform special effect processing on videos, they only support adding one special effect to the video at a time, and the application needs to process multiple times and provide previews to realize the addition of multiple special effects in the video. This special effect processing method will lead to low special effect processing efficiency, increasing of the burden of video rendering, and cause poor user experience. In this regard, in the present disclosure, the above step 102 may further include: the first application identifies the target object in the current video frame; the first application determines at least one target special effect to be superimposed according to the received special effect setting instruction; and the first application superimposes at least one target special effect to be superimposed with the target object, and generates a target video frame.

The target object in the current video frame can be anything in the current video frame. Exemplarily, the target object may be a character. In the case that there are multiple characters in the current video frame, the target object may be all characters existing in the current video frame, or may be one or several characters among the multiple characters, for example, the target object can be the character whose face area occupies the largest proportion in the video screen. The target object can be identified by using the relevant image processing technology, which is not described and limited too much herein.

During the operation of the first application, the first application may provide a special effect setting interface to the user. In an embodiment, the special effect setting interface includes a preview area and a special effect setting area, and multiple special effect setting components are set in the special effect setting area. By setting the component operation for multiple special effects on the effect setting interface, the user can perform at least one special effect setting on the target object (for example, a character in the video frame) in the video frame displayed in the preview area and watch the special effect-processed video in real time through the preview area.

When the user performs the special effect setting operation, the first application can receive the corresponding special effect setting instruction, where the special effect setting instruction can indicate what special effect setting operation is applied by the user. Exemplarily, when the user chooses to superimpose a certain special effect, the first application may receive the special effect setting instruction. Through the special effect setting instruction, the first application can know the special effect that the user selects to superimpose. It should be noted that, during the running of the first application, the user can adjust the special effect in real time, and correspondingly, the first application can also receive the corresponding special effect setting instruction in real time.

After receiving the special effect setting instruction input by the user, the first application may determine at least one target special effect to be superimposed according to the special effect setting instruction. In the present disclosure, the first application may provide multiple special effects for the user to select. For example, the first application may provide the user with multiple special effects by setting multiple special effect setting components on the special effect setting interface. The special effect type refers to the category to which the special effect belongs, such as "beauty", "filter", "sticker", "background", and so on. The user can select one or more of the provided different types of special effects as the target special effect to be superimposed. For example, if the user chooses to add two effects, "background" and "sticker", the first application can determine that these two special effects are the target special effects to be superimposed according to the received special effect setting instruction. Afterwards, the first application may superimpose the target special effect with the target object to generate the target video frame.

Exemplarily, the first application can identify the feature information of the target object, and the feature information may include, for example, position feature information, human skeleton feature information, face feature information, and so on. The first application then can superimpose the target special effect to be superimposed with the target object and generate the target video frame, based on the target special effect to be superimposed and the feature information corresponding to each target special effect. Among them, the special effect-processed target video frame can be rendered for display. In an optional implementation, the processed target video frame can be displayed by the first application through the preview area.

Exemplarily, assuming that the target object in the current video frame is a character, the target special effect determined by the special effect setting instruction includes a "background" special effect and a "sticker" special effect, the first application then can superimpose the above two special effects with the character in the current video frame, so as to obtain the target video frame with the "background" special effect and the "sticker" special effect. It should be understood that superimposing a "background" special effect with a character in a video frame refers to processing the background of the character in the video frame, that is, it can be understood as combining and processing a foreground character in the video frame with the "background" special effect to be superimposed.

In an embodiment, the first application may display a special effect setting interface, where the special effect setting interface includes a special effect setting area, and multiple special effect setting components are set in the special effect setting area. In this way, the user can operate one or more of the multiple setting components in the special effect setting interface to select the effect to be superimposed. Correspondingly, the first application can continuously detect operations for the multiple special effect setting components, and receive a special effect setting instruction input by the user. For example, the first application may continuously detect an addition operation for the "sticker" special effect setting component and for the "background" special effect setting component. Thus, the special effect setting instruction input by the user is received, so that the target special effect includes two special effects of "background" and "sticker". Further, the special effect setting interface can also display the preview area. Before superimposing the special effect, the preview area can display the video frames captured from the image acquisition apparatus. And after the special effect is superimposed, the preview area can display the target video frame superimposed with a special effect in real time.

Figure 5A:
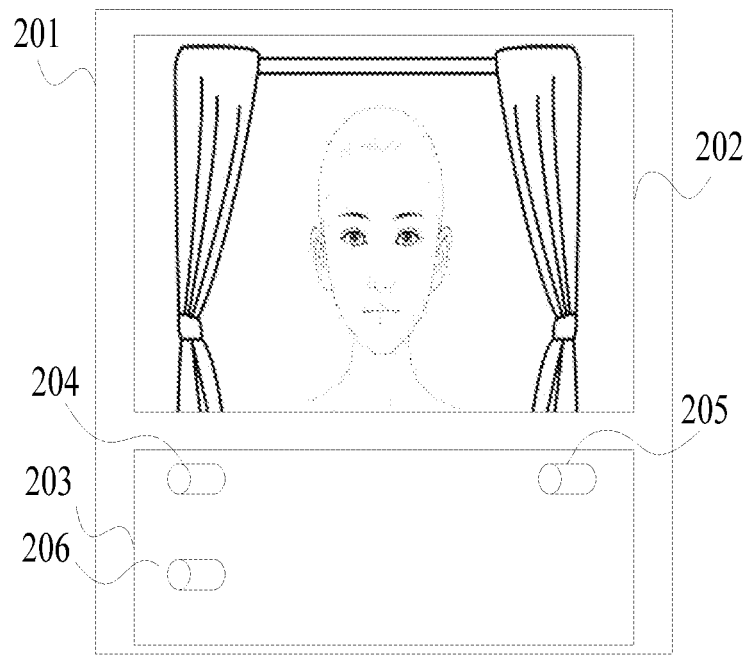
FIG. 5A and FIG. 5B show schematic diagrams of an application scenario of the special effect processing method provided by the present disclosure.
Figure 5B:
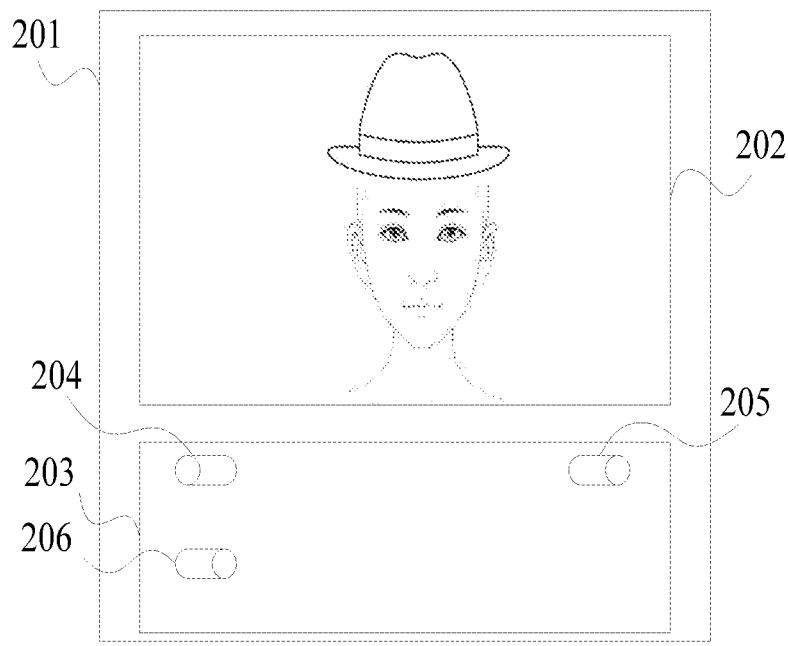

FIG. 5A and FIG. 5B show schematic diagrams of an application scenario of the special effect processing method provided by the present disclosure.

As shown in FIG. 5A and FIG. 5B, the special effect setting interface displayed on the first application 201 may include a preview area 202 and a special effect setting area 203. And in the special effect setting area 203 of the special effect setting interface, a "beauty" special effect selection component 204, a "background" special effect selection component 205, and a "sticker" special effect selection component 206 are provided.

Exemplarily, when the first application is started, the first application 201 acquires the video frame captured by the image acquisition apparatus. Since the user has not yet selected to add the special effect, the video frame is displayed in the preview area 202. As shown in FIG. 5A, the video frame is displayed in preview area 202. Among them, in FIG. 5A, the component states currently shown in the "beauty" special effect setting component 204, the "background" special effect setting component 205, and the "sticker" special effect setting component 206 in the special effect setting area 203 indicates that the "beauty" special effect, the "background" special effect, and the "sticker" special effect are not enabled.

When the user operates in the special effect setting area 203, the first application 201 continuously detects the user's operations on the special effect setting components 204-206 in the special effect setting area 203, so as to determine the special effect setting instruction input by the user. For example, when detecting that the user chooses to add the two special effect of "background" and "sticker" by continuously starting the components corresponding to "background" and "sticker", the first application 201 may superimpose the default background image of the "background" special effect and the default sticker content of the "sticker" special effect with the target object (for example, a character), and generate a target video frame. For example, the default background image for a "background" special effect is a blank image, and the default sticker content for a "sticker" special effect is a hat. As shown in FIG. 5B, the first application 201 can display the target video frame with the above two special effects superimposed on the target object in real time through the preview area 202. In addition, in FIG. 5B, the component states currently shown in the "background" special effect setting component 205 and the "sticker" special effect setting component 206 in the special effect setting area 203 indicates that the "background" special effect and the "sticker" special effect are enabled.

In addition, the special effect setting components in the special effect setting area 203 may include, but are not limited to: a button component, a gesture component, a voice recognition component, a face recognition component, and so on. Correspondingly, detecting the user's operation on the special effect setting component to determine the special effect setting instruction input by the user may respectively include: determining the special effect setting instruction input by the user through detecting the user's click operation on the button component; determining the special effect setting instruction input by the user through detecting the user's gesture; determining the special effect setting instruction input by the user through detecting the voice instruction input by the user; and determining the special effect setting instruction input by the user through detecting the user's facial features and so on, which is not limited in the present disclosure.

In addition, in the present disclosure, the user can adjust or modify the special effect in real time according to their needs. For example, when the user operates in the special effect setting area 203 and chooses to delete the two special effects of "background" and "sticker" by closing the components corresponding to "background" and "sticker", the first application 201 can display the video frame obtained by deleting the two special effects of "background" and "sticker" from the target object in real time through the preview area 202. Or, after the "background" special effect and the "sticker" special effect have been superimposed on the target object in the video frame, when the user operates in the special effect setting area 203, and then selects to add the "beauty" special effect by opening the component corresponding to "beauty", the first application 201 can display the video frame obtained by superimposing the "beauty" special effect, the "background" special effect and the "sticker" special effect on the target object through the preview area 202. In addition, the first application 201 may also set a sub special effect setting option in each special-effect setting component, and determine a sub special effect of each special effect that the user wants to set by detecting the user's operation on the sub special effect setting option. The specific detection and superposition methods are similar to those described above, and are not repeated here.

Through the above technical solution, on the basis of the current video frame, synchronized superposition of at least one special effect can be realized through one video processing process, so that at least one special effect can take effect at the same time, thereby improving the special effect processing efficiency. In addition, since the video frame superimposed with at least one special effect can be directly obtained, the terminal can provide the user with a video superimposed with at least one special effect through one video rendering process. In this way, by eliminating unnecessary intermediate video rendering process, not only the video transmission efficiency and the terminal performance can be improved, but also the user experience can be improved.

The following describes a specific implementation in which the above first application determines at least one target special effect to be superimposed according to the received special effect setting instruction.

First, the set of special effects to be superimposed is updated according to the special effect setting instruction.

In this embodiment, each of the at least one target special effect includes at least one sub special effect to be superimposed. Sub special effect represents a special effect sub item included in each effect. Exemplarily, taking the target special effect including the "beauty" special effect and the "sticker" special effect as an example, the sub special effects to be superimposed included in the "beauty" special effect may include but are not limited to a "lipstick" sub special effect and a "face-lift" sub special effect, etc. The sub special effects to be superimposed included in the "sticker" special effect may include sub special effects with different patterns and shapes, such as the sub special effect with the content of the sticker being a hat, the sub special effect with the content of the sticker being a cat's face and so on. The "background" special effect can include different background image sub special effects.

In one embodiment, if it is detected that the user chooses to add a certain special effect, the first application may superimpose the default sub special effect of the special effect with the target object in the video frame. In addition, the first application can also set multiple sub special effect setting components for each special effect, so that the user can further set one or more sub special effects corresponding to each special effect, so as to perform special effect processing on the target object in the video frame.

Figure 6:
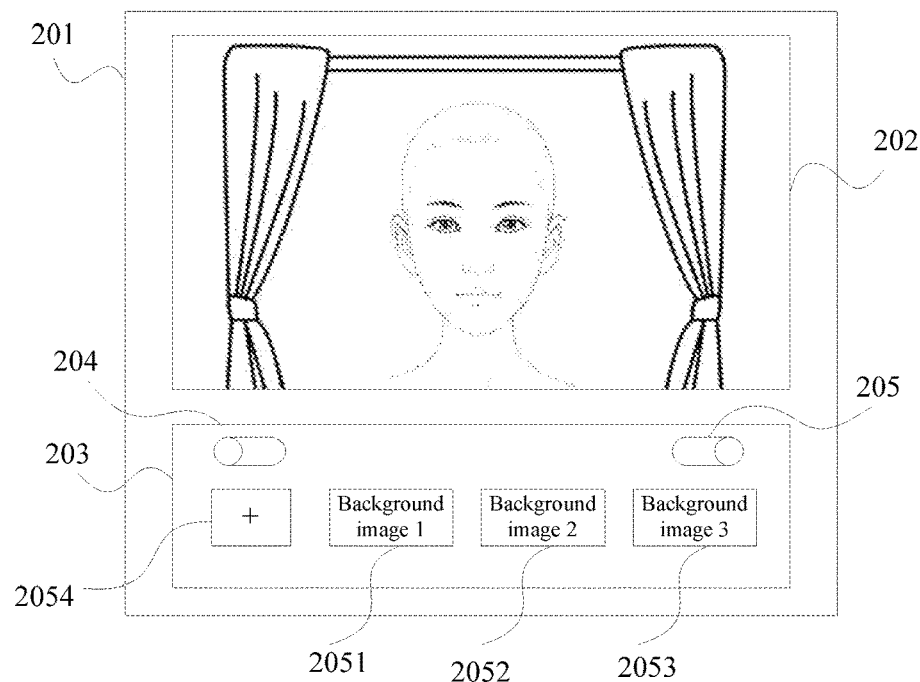
FIG. 6 shows a schematic diagram of another application scenario of the special effect processing method provided by the present disclosure.

For example, when the user operates in the special effect setting area 203 and chooses to add the "background" special effect, the special effect setting area 203 of the first application 201 may further provide a sub special effect setting component included in the "background" special effect. As shown in FIG. 6, when it is detected that the user has opened the "background" special effect setting component 205, the first application 201 sets the sub special effect setting components with different background images in the special effect setting area 203, for example, a sub special effect setting component 2051 of background image 1, a sub special effect setting component 2052 of background image 2, and a sub special effect setting component 2053 of background image 3. In addition, the first application 201 may also provide a sub special effect setting component 2054 which is used by the user to locally select an image from this first terminal as the background image.

It should be noted that, when the sub special effect setting component included in the "background" special effect is displayed in the special effect setting area 203, the sub special effect setting component can be covered with the "sticker" special effect setting component 206, that is, the "sticker" special effect setting component 206 cannot be displayed in the special effect setting area 203 in FIG. 6. However, after the user selects the background image to be added, each sub special effect setting component included in the "background" special effect will exit the display from the special effect setting area 203. Correspondingly, the special effect setting area 203 will display the "sticker" special effect setting component 206 again (as shown in the special effect setting area 203 in FIG. 5B).

The first terminal locally stores a set of special effects to be superimposed, and elements in the set of special effects to be superimposed may include special effect parameters of each sub special effect to be superimposed in at least one target special effect. Where the special effect parameter may include the type of special effect to which the corresponding sub special effect to be superimposed belongs, for example, the special effect parameters of the "lipstick" sub special effect may include parameters used to indicate that the "lipstick" sub special effect belongs to the "beauty" special effect. In addition, the specific form of the set of special effects to be superimposed may be set to, for example, an array, a list and so on, which is not limited in the present disclosure. Considering that the subsequent access of the first application to the set of special effects to be superimposed is mostly random, the array can better support a random access. Therefore, preferably, the specific form of the set of special effects to be superimposed may include the form of an array.

In one embodiment, the special effect setting instruction may include instructions for adding, deleting, or adjusting sub special effects, and the first terminal may update the set of special effects to be superimposed according to the instruction for instructing to add, delete or adjust sub special effects.

Figure 7A:
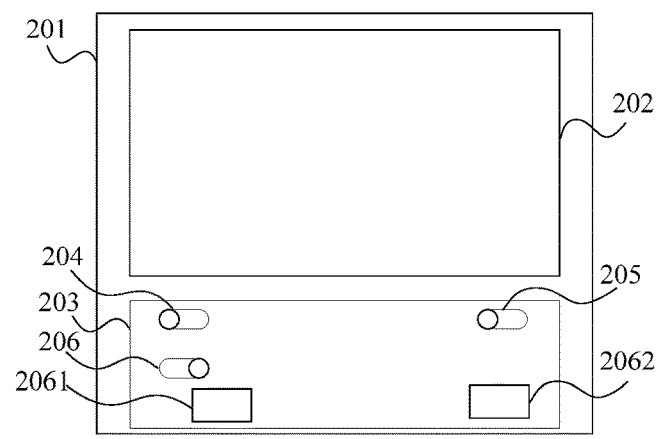
FIG. 7A to FIG. 7C show schematic diagrams of another application scenario of the special effect processing method provided by the present disclosure.
Figure 7B:
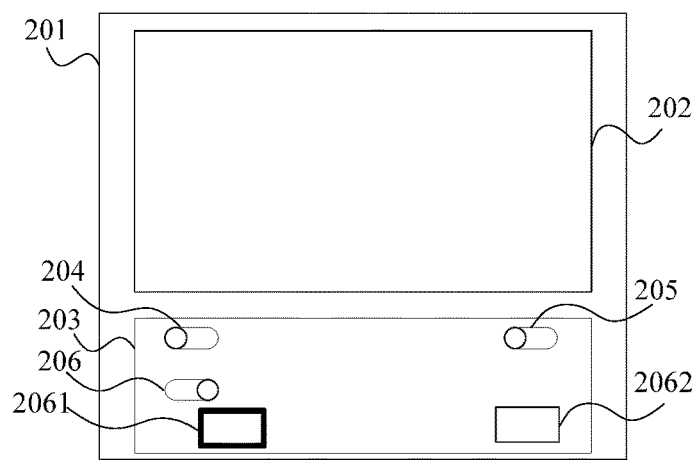

Exemplarily, when the special effect setting instruction includes the special effect adding instruction, the first terminal adds the special effect parameters of the sub special effect selected to add by the user to the set of special effects to be superimposed, according to the special effect adding instruction. Taking the "sticker" special effect setting component 206 set in the special effect setting area 203 as an example, as shown in FIG. 7A, the "sticker" special effect setting component 206 includes a sub special effect setting component 2061 and a sub special effect setting component 2062, where the sub special effect setting component 2061 and the sub special effect setting component 2062 indicates different sub special effects, for example, different sticker patterns. In FIG. 7A, the component statuses currently shown by the sub special effect setting component 2061 and the sub special effect setting component 2062 indicate that the corresponding sub special effects thereof are not set, that is, the sub special effects corresponding to the sub special effect setting component 2061 and the sub special effect setting component 2062 respectively are not set, and accordingly, their corresponding effect parameters are not added to the set of special effects to be superimposed. When it is detected that the user operates in the special effect setting area 203 and selects to add the sub special effect corresponding to the sub special effect setting component 2061, the first application 201 can receive the special effect setting instruction including the special effect adding instruction, and then can add the special effect parameters of the sub special effect corresponding to the sub special effect setting component 2061 to the set of special effects to be superimposed. In FIG. 7B, the component state currently shown by the sub special effect setting component 2061 indicates that the sub special effects corresponding to the component have been set, and accordingly, their corresponding effect parameters have been added to the set of special effects to be superimposed.

In the present disclosure, when it is detected that the user starts to add a special effect, the first application 201 can also superimpose a default sub special effect and a default setting value of the sub special effect corresponding to the special effect with the target object. Exemplarily, when the user operates in the special effect setting area 203 and selects to add the "beauty" special effect by starting the component corresponding to the "beauty" special effect, the first application 201 can receive the special effect setting instruction including the special effect adding instruction, and then can add the default setting value of the default sub special effect included in the "beauty" special effect to the set of special effects to be superimposed.

As another example, when the special effect setting instruction includes a special effect cancellation instruction, the first terminal can delete the special effect parameters of sub special effect that the user selects to cancel from the set of special effects to be superimposed, according to the special effect cancellation instruction. Exemplarily, in the case that the special effect parameters of the sub special effects corresponding to the sub special effect setting component 2061 have been added to the set of special effects to be superimposed, when it is detected that the user clicks the sub special effect setting component 2061 again, the first application 201 can receive the special effect setting instruction including the special effect cancellation instruction, and then delete the special effect parameters of the sub special effects corresponding to the sub special effect setting component 2061 from the set of special effects to be superimposed. In an embodiment, when it is detected that the user cancels a special effect, the first application 201 can delete the special effect parameters of all sub special effects of the special effect in the set of special effects to be superimposed.

Figure 7C:
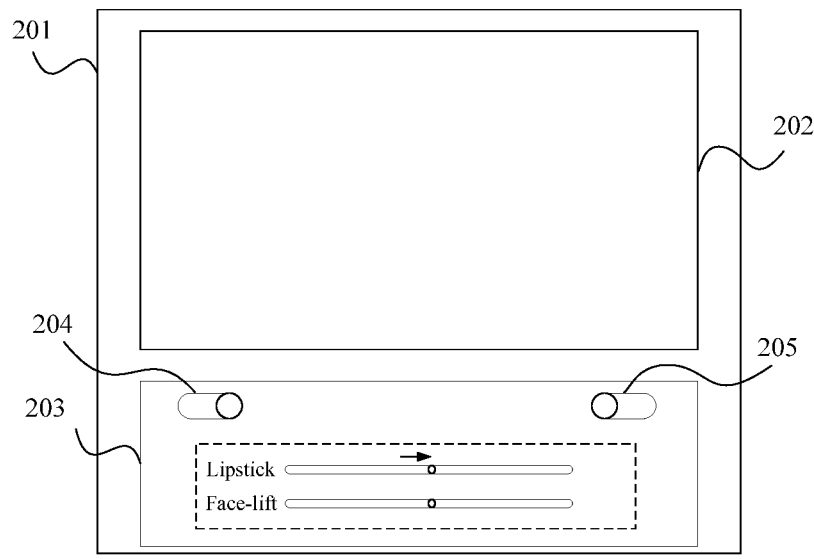

As another example, the above special effect parameters also include the corresponding special effect parameter values of the sub special effect to be superimposed. When the special effect setting instruction includes the special effect adjustment instruction, the first terminal can adjust the special effect parameter values of the sub special effect selected and adjusted by the user in the set of special effects to be superimposed, according to the special effect adjustment instruction. For example, when it is detected that the user operates in the special effect setting area 203 and selects to add the "beauty" special effect, the first application 201 can further display the sub special effect setting components of the sub special effects included in the "beauty" special effect in the special effect setting area 203. As shown in FIG. 7C, the special effect setting area 203 displays the "lipstick" sub special effect setting component and the "face-lift" sub special effect setting component. The user can adjust a degree value of "face-lift" according to actual needs. For example, sliding an adjusting lever in the "face-lift" sub special effect setting component in a direction of an arrow in FIG. 7C, and adjusting the degree value of "face-lift" from the currently displayed 50% to 70%. Accordingly, the first application 201 can receive the special effect setting instruction including the special effect adjustment instruction, and then can adjust the special effect parameter values in the special effect parameters of the "face-lift" sub special effect in the set of special effects to be superimposed.

Similarly, when each sub special effect setting component included in the "beauty" special effect are displayed in the special effect setting area 203, the sub special effect setting component can cover the "sticker" special effect setting component 206, that is, the "sticker" special effect setting component 206 cannot be displayed in the special effect setting area 203 in FIG. 7C. However, after the user has finished adjusting the effect parameters of the sub special effect for which he or she has selected to adjust, each sub special effect setting component included in the "beauty" special effect will exit the display from the special effect setting area 203. Accordingly, the special effect setting area 203 will display the "sticker" special effect setting component 206 again.

It is worth noting that the contents shown in FIG. 5A, FIG. 5B, FIG. 6, FIG. 7A to FIG. 7C are only used as scenario examples when using the special effect processing method provided by the present disclosure, which is only for the purpose of explanation, so that those skilled in the art can better understand the special effect processing method provided by the present disclosure, and are not used to limit the present disclosure.

Then, according to the updated set of special effects to be superimposed, at least one target special effect to be superimposed is determined.

Considering the sub special effects stored in the set of special effects to be superimposed, in practical applications, some special effect or sub special effects may not be suitable for simultaneous superimposition because they can be processed for the same part of the target object (for example, a "Augmented Reality (AR)" special effect and a "face deformation" special effect are not suitable for simultaneous superposition, the "lipstick" sub special effect included in the "beauty" special effect and the "lipstick" sub special effect included in the "sticker" special effect are not suitable for simultaneous superposition, a "powder blusher" sub special effect included in the "beauty" special effect and "powder blusher" sub special effect included in "sticker" special effect are not suitable for simultaneous superposition, a "big head" sub special effect and the "face-lift" sub special effect are not suitable for simultaneous superposition and so on). Therefore, in the present disclosure, the special effect parameters of the sub special effect stored in the updated set of special effects to be superimposed can be further analyzed to determine whether the multiple sub special effects can be superimposed. If it is determined that they can be superimposed, each sub special effect in the set of special effects to be superimposed will be determined as the sub special effect to be superimposed. If it is determined that some or all sub special effects cannot be superimposed at the same time, it is selected from the sub special effects that cannot be superimposed at the same time to determine the sub special effects to be superimposed.

In an embodiment, it is determined whether there are one or more mutually exclusive sub special effects in the updated set of special effects to be superimposed, according to the special effect parameters of the sub special effects to be superimposed in the updated set of special effects to be superimposed; in response to determining that there are mutually exclusive sub special effects, for each group of mutually exclusive sub special effects, one of the mutually exclusive sub special effects is selected as an enabled sub special effect, according to the priority parameter in the effect parameters of the mutually exclusive sub special effects; the enabled sub special effect is determined as the sub special effect to be superimposed; and at least one target special effect to be superimposed is determined according to the special effect parameters of the determined sub special effect to be superimposed.

In this embodiment, the special effect parameters of each sub special effect can also include mutually exclusive parameters, where the mutually exclusive parameters are used to indicate the sub special effects mutually exclusive with the corresponding sub special effects to be superimposed. By setting the mutually exclusive parameters, the sub special effects mutually exclusive with the sub special effects to be superimposed can be set in the special parameters of the at least sub special effect. Among them, the mutually exclusive sub special effects of a sub special effect can be one or multiple. In this way, for each sub special effect to be superimposed in the updated set of special effects to be superimposed, it is determined that whether there are sub special effects mutually exclusive with the sub special effects to be superimposed in the updated set of special effects to be superimposed, according to the mutually exclusive parameters in the special effect parameters of the sub special effects to be superimposed. If there are mutually exclusive sub special effects, the sub special effects to be superimposed and the determined sub special effects can be regarded as a set of mutually exclusive sub special effects.

Exemplarily, the special effect parameters of the sub special effect may include mutually exclusive parameters, and the mutually exclusive parameters include identifications of other sub special effects mutually exclusive with this sub special effect. Supposing that the updated set of special effects to be superimposed stores special effect parameters of a sub special effect 1 (for example, the "powder blusher" sub special effect included in the "beauty" special effect), special effect parameters of a sub special effect 2 (for example, the "powder blusher" sub special effect included in the "sticker" special effect), special effect parameters of a sub special effect 3 (for example, a "fashion glasses" sub special effect included in the "sticker" special effect) and special effect parameters of a sub special effect 4 (for example, the "eyebrow" sub special effect included in the "beauty" special effect). And the mutually exclusive parameters included in the special effect parameters of sub special effect 1 include the identification of the sub special effect 2, and the mutually exclusive parameters in the special effect parameters of the sub special effect 3 include the identification of sub special effect 4. In this way, the first application can determine that the sub special effect 1 and the sub special effect 2 are mutually exclusive sub special effects, and the sub special effect 3 and the sub special effect 4 are mutually exclusive sub special effects, take the sub special effect 1 and the sub special effect 2 as a group of mutually exclusive sub special effects, and take the sub special effect 3 and sub special effect 4 as a group of mutually exclusive sub special effects, based on the mutually exclusive parameters included in the special effect parameters of the sub special effect to be superimposed in the updated set of special effects to be superimposed.

When it is determined that there are one or more group of mutually exclusive sub special effects in the updated set of special effects to be superimposed according to the above method, it indicates that these sub special effects cannot coexist, that is, they cannot be superimposed at the same time. At this time, it is necessary to select an effect from the mutually exclusive sub special effects as the enabled effect to be superimposed with the target object in the video frame. Exemplarily, the special effect parameters of sub special effects can also include priority parameters and addition time parameters. Accordingly, for each group of mutually exclusive sub special effects, the sub special effect with the highest priority is determined according to the priority parameters in the special effect parameters of mutually exclusive sub special effects in the group, and the sub special effect with the highest priority are regarded as an enabled sub special effect, while the sub special effects without the highest priority in the group will be ignored, not as the enabled sub special effect. If the priority of each sub special effect in the mutually exclusive sub special effect is the same, then the addition time parameters in the effect parameters of the mutually exclusive sub special effect are compared, and the recently added sub special effect in the mutually exclusive sub special effect is taken as the enabled sub special effect, while the earlier added sub special effect in the mutually exclusive sub special effect will be ignored and will not be used as the enabled sub special effect.

Following the example above, the special effect parameters from the sub special effect 1 to the sub feature 4 include priority parameters and addition time parameters. According to the priority parameters included in the special effect parameters of each sub special effect, it is determined that the priority of the sub special effect 1 is higher than that of the sub special effect 2, and the priority of the sub special effect 3 is the same as that of the sub special effect 4. Further, according to the addition time parameter in the special effect parameters of the sub special effect 3 and the sub special effect 4, it is determined that the addition time of the sub special effect 3 is earlier than that of the sub special effect 4. Therefore, the first application can take the sub special effect 1 and the sub special effect 4 as the enabled sub special effects, that is, the sub special effect 1 and the sub special effect 4 are taken as the sub special effects to be superimposed.

In addition, for other sub special effects except mutually exclusive sub special effects in the updated set of special effects to be superimposed, since there are no sub special effects mutually exclusive with the other sub special effects in the updated set of special effects to be superimposed, the first application can treat the other sub special effects and the enabled sub special effects determined above as sub special effects to be superimposed. Following the example above, assuming that the updated set of special effects to be superimposed also includes the effect parameters of a sub special effect 5 (for example, a background image sub special effect in the "filter" special effect), and there is no mutually exclusive relationship between the sub special effect 5 and the sub special effect 1 to the sub special effect 4, the first application can also take the sub special effect 5 as the sub special effect to be superimposed. In this way, it can be finally determined that the sub special effects to be superimposed includes the sub special effect 1, the sub special effect 4 and the sub special effect 5. Then, according to the special effect parameters of the sub special effect 1, the sub special effect 4 and the sub special effect 5, at least one target special effect to which the sub special effect 1, the sub special effect 4 and the sub special effect 5 belong is determined, and the sub special effect 1, the sub special effect 4 and the sub special effect 5 are superimposed with the target object, so as to realize the superposition of at least one special effect and the target object in the current video frame.

Using this embodiment to determine at least one target special effect can avoid using the sub special effects with mutually exclusive relationship as the sub special effects to be superimposed, ensuring that the subsequent multiple effects superimposed with the target object are the special effects that can be superimposed logically, so as to achieve the normal video rendering effect.

In addition, when choosing to add a special effect, the user often add multiple special effects quickly and continuously. Different from the processing method of video special effect in related technologies, in the above method provided by the present disclosure, a special effect caching mechanism can be realized by providing a set of special effects to be superimposed. In other words, the special effect parameters of the special effect selected to add by the user will first be stored in the set of special effects to be superimposed. The first application will not immediately process the current video frame according to the special effect, but first update the set of special effects to be superimposed, and then determine at least one target special effect to be superimposed with the target object in the video frame according to the updated set of special effects to be superimposed.

By providing the set of special effects to be superimposed, if the user chooses to add multiple special effects in a process of updating the set of special effects to be superimposed, the multiple special effect can be superimposed at one time on the basis of the current video frame, which does not require that, as in the related technologies, each time the user adds a sub special effect included in a special effect, the terminal must perform a video special effect processing and rendering process. In this way, it can effectively improve the efficiency of special effect processing, avoid an unnecessary intermediate video rendering process, and can directly provide the user with video frames superimposed with multiple special effects, thereby improving the user experience.

It should be noted that if there is only one sub special effect to be superimposed in the updated set of special effects to be superimposed, at this time, the first application will superimpose the sub special effect to be superimposed with the target object and generate the target video frame.

In addition, if the updated set of special effects to be superimposed does not include the sub special effects to be superimposed, it means that the user does not currently choose to add the special effect, or the user cancels all previously added special effect. At this time, the first application retains the current video frame.

When rendering different special effect to be superimposed, the post rendered special effect to be superimposed will block the pre rendered special effect to be superimposed. Therefore, in order to ensure the effect of the special effect, it is necessary to determine a rendering order of the special effect to be superimposed. For example, the "beauty" special effect can be rendered first, and then the "sticker" special effect will be rendered.

Therefore, in the case of multiple target special effects, a processing sequence of the multiple target special effects is determined; and according to the processing sequence of the multiple target special effects, multiple target special effects are superimposed with the target object and the target video frame is generated.

In an embodiment, the processing sequence of the multiple target special effects can include an order from early to late according to the addition time, which is that the earlier the target special effect is added, the higher the processing sequence is.

In another embodiment, the above steps of determining the processing sequence of the multiple target special effects can further include:

determining the processing sequence of the multiple target special effects according to the processing sequence parameters of each target special effect. That is, in this embodiment, the processing sequence of the target special effects is sorted according to the processing sequence parameter.

The processing sequence parameter of the special effect is used to indicate the processing sequence of the special effect itself relative to other special effects. For example, it is assumed that the multiple target special effects can include: a target special effect 1, a target special effect 2, and a target special effect 3. Among them, the processing sequence parameter of the target special effect 1 is a parameter P1, the processing sequence parameter of the target special effect 2 is a parameter P2, and the processing sequence parameter of target special effect 3 is a parameter P3. If the parameter P3 is greater than the parameter P2, and the parameter P2 is greater than the parameter P1, the processing sequence is: the target special effect 3, the target special effect 2, and the target special effect 1.

It is worth noting that, for different target special effects with the same processing sequence parameters, these target special effects can be further sorted according to the addition time of each target special effect from early to late. The earlier the target special effect is added, the higher the processing sequence is.

Through the above technical solution, the special effects can be superimposed in an orderly manner during a one-time processing of multiple target special effects for the current video frame, so as to ensure a smooth processing of the video special effect.

The above special effect processing method can also include: displaying the generated target video frame in real time in the preview area of the first application.

In this embodiment, the first application can display a special effect setting interface, which includes a preview area. After the first application generates the target video frame, the generated target video frame can be displayed in real time in its preview area (as shown in FIG. 5B). In this way, the user can watch the video after special effect processing in real time through the special effect setting interface provided by the first application.

In addition, those skilled in the art should understand that the present disclosure may also use other special effect processing methods to generate the target video frame, which is not limited in the present disclosure.

Figure 8:
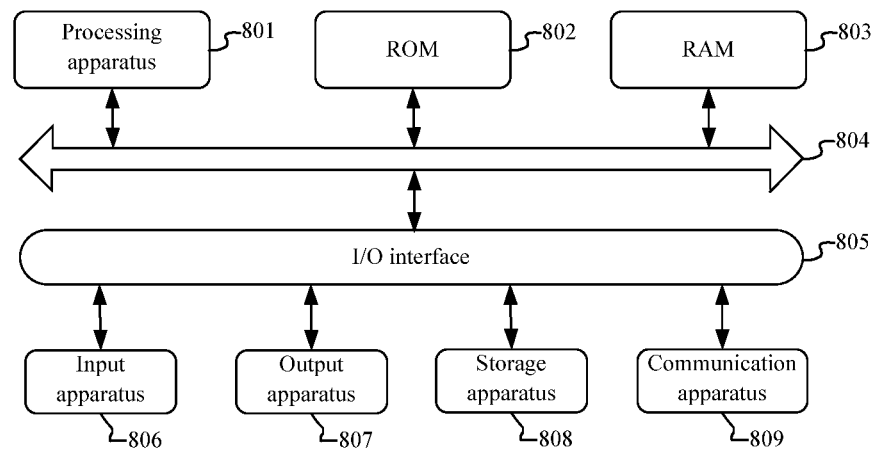
FIG. 8 is a schematic structural diagram of an electronic device according to an exemplary embodiment.

Referring to FIG. 8 below, it shows a schematic structural diagram of an electronic device 800 suitable for implementing the embodiments of the present disclosure. The terminal device in the embodiments of the present disclosure may include, but are not limited to, a mobile terminal such as a mobile phone, a notebook computer, a digital broadcast receiver, a PDA (Personal Digital Assistant), a PAD (Portable Android Device), a PMP (Portable Media Player), an in-vehicle terminal (e.g., an in-vehicle navigation terminal), a personal wearable electronic device, etc., and a fixed terminal such as a digital TV, a desktop computer, etc. The electronic device shown in FIG. 8 is only an example, and should not impose any limitation on the function and the scope of use of the embodiments of the present disclosure.

As shown in FIG. 8, the electronic device 800 may include a processing apparatus 801 and a storage apparatus 808. The storage apparatus 808 is configured to store a program for executing the methods described in the above method embodiments; and the processing apparatus 801 is configured to execute a program stored in the memory, so that the functions of the embodiments of the present disclosure described above and/or other desired functions are achieved. The processing apparatus (for example, a central processor, a graphics processor and so on.) 801 may perform various appropriate actions and processes according to a program stored in a read only memory (ROM) 802 or a program loaded from a storage apparatus 808 into a random access memory (RAM) 803. In the RAM 803, various programs and data necessary for the operation of the electronic device 800 are also stored. The processing apparatus 801, the ROM 802, and the RAM 803 are connected to each other through a bus 804. An input/output (I/O) interface 805 is also connected to the bus 804.

Typically, the following apparatuses can be connected to the I/O interface 805: an input apparatus 806 including, for example, a touch screen, a touchpad, a keyboard, a mouse, a camera, a microphone, a accelerometer, a gyroscope and so on; an output apparatus 807 including, for example, a liquid crystal display (LCD), a speaker, a vibrator and so on; the storage apparatus 808 including, for example, a magnetic tape, a hard disk and so on; and a communication apparatus 809. The communication apparatus 809 may allow the electronic device 800 to communicate wirelessly or by wire with other devices to exchange data. While FIG. 8 shows an electronic device 800 having various apparatuses, it should be understood that not all of the illustrated apparatus are required to be implemented or provided. More or fewer apparatuses may alternatively be implemented or provided.

In particular, according to the embodiments of the present disclosure, the process described above with reference to the flowcharts may be implemented as a computer software program. For example, the embodiments of the present disclosure include a computer program product, including a computer program carried on a non-transitory computer-readable medium, where the computer program contains a program code for executing the method described in the each embodiment above. In such an embodiment, the computer program may be downloaded and installed from the network via the communicating apparatus 809, or installed from the storage apparatus 808, or installed from the ROM 802. When the computer program is executed by the processing apparatus 801, the steps in the methods of the embodiments of the present disclosure are executed, so as to implement the functions of the embodiments described in the present disclosure and/or other desired functions.

According to some embodiments of the present disclosure, the present disclosure further provides a computer program, where the computer program is stored in a readable storage medium, at least one processor of an electronic device can read the computer program from the readable storage medium, and the at least one processor executes the computer program, so that the electronic device executes the solution provided by any of the foregoing embodiments.

It should be noted that the above computer readable medium of the present disclosure may be a computer readable signal medium or a computer readable storage medium or any combination of the above two. The computer readable storage medium may be, for example, but not limited to, an electrical, a magnetic, an optical, an electromagnetic, an infrared, or a semiconductor system, apparatus or device, or a combination of any of the above. More specific examples of the computer readable storage medium may include, but are not limited to, electrical connection with one or more wires, a portable computer disk, a hard disk, a random access memory (RAM), a read only memory (ROM), an erasable programmable read only memory (EPROM or Flash), a fiber optic, a portable compact disc read only memory (CD-ROM), an optical storage device, a magnetic storage device, or any suitable combination of the above. In the present disclosure, a computer readable storage medium may be any tangible medium that contains or stores a program that may be used by or in conjunction with an instruction execution system, apparatus, or device. In the present disclosure, however, the computer readable signal medium may include a data signal propagated in a baseband or as a part of a carrier wave with a computer readable program code carried therein. This propagated data signal may take many forms, Including, but not limited to, an electromagnetic signal, an optical signal, or any suitable combination of the foregoing. The computer readable signal medium may also be any computer readable medium other than the computer readable storage medium, where the computer readable signal medium may send, propagate, or transmit a program for use by or in connection with an instruction execution system, apparatus, or device. A program code included in the computer readable medium may be transmitted using any suitable medium including, but not limited to, an electrical wire, an optical cable, RF (radio frequency), etc., or any suitable combination of the above.

In some implementations, a terminal may use any currently known or future developed network protocol such as a HTTP (HyperText Transfer Protocol) for communication, and may interconnect with any form or medium of digital data communication (e.g., communication network). Examples of communication networks include a local area network (LAN), a wide area network (WAN), an internet (e.g., the Internet), and a peer-to-peer network (e.g., an ad hoc peer-to-peer network), and any currently known or future developed networks.

The above computer readable medium may be included in the above electronic device; and it may also exist alone without being assembled into the electronic device.

The above computer readable medium carries one or more programs, and when the above one or more programs are executed by the electronic device, the electronic device is enable to: acquire a current video frame; perform special effect processing on the current video frame according to a received the special effect setting instruction, and generate a target video frame; and send the target video frame to the second application.

A computer program code for performing operations of the present disclosure may be written in one or more programming languages or a combination thereof, the above programming languages include but not limited to object-oriented programming languages—such as Java, Smalltalk, C++, and also include conventional procedural programming languages—such as the "C" language or similar programming languages. The program code may be performed entirely on the user's computer, partly on the user's computer, as a stand-alone software package, partly on the user's computer and partly on a remote computer, or entirely on the remote computer or the server. In cases involving the remote computer, the remote computer may be connected to the user's computer through any kind of network, including a local area network (LAN) or a wide area network (WAN), or may be connected to an external computer (e.g., connected using an Internet service provider via the Internet).

Flowcharts and block diagrams in the drawings illustrate system architectures, functions, and operations which may be implemented according to systems, methods and computer program products of various embodiments of the present disclosure. In this regard, each block in the flowcharts or the block diagrams may represent a module, a program segment, or a portion of code that contains one or more executable instructions for implementing the specified functions. It should also be noted that, in some alternative implementations, the functions noted in the blocks may occur in an order different from that noted in the drawings. For example, two blocks shown in a succession may, in fact, be performed substantially in parallel, or they may sometimes be performed in a reverse order, and this depends upon the function involved. It is also to be noted that each block in the block diagrams and/or the flowcharts, and the combination of blocks in the blocks diagrams and/or the flowcharts, may be implemented in a dedicated hardware-based system that perform specified functions or operations, or may be implemented by the combination of dedicated hardware and computer instructions.

The functions described herein above may be performed, at least in part, by one or more hardware logic components. For example, without limitation, exemplary types of hardware logic components that may be used include: a field programmable gate array (FPGA), an application specific integrated circuit (ASIC), application specific standard parts (ASSP), a system on chip (SOC), a complex programming logic device (CPLD) and so on.

In the context of the present disclosure, a machine readable medium may be a tangible medium that may contain or store a program for use by or in connection with an instruction execution system, apparatus, or device. The machine readable medium may be a machine readable signal medium or a machine readable storage medium. The machine readable medium may include, but are not limited to, an electronic, a magnetic, an optical, an electromagnetic, an infrared, or a semiconductor system, apparatus or device, or any suitable combination of the foregoing. More specific examples of the machine readable storage medium may include one or more wire-based electrical connections, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable combination of the foregoing.

According to one or more embodiments of the present disclosure, example 1 provides a video transmission method, applied to a first application installed in a first terminal, where the first terminal is further installed with a second application. The method includes: acquiring a current video frame; performing special effect processing on the current video frame according to a received special effect setting instruction, and generating a target video frame; and sending the target video frame to the second application.

According to one or more embodiments of the present disclosure, example 2 provides the method of example 1, where the method further includes: triggering the first terminal to create a virtual device; and sending the target video frame to the virtual device, so that the virtual device sends the acquired target video frame to the second application.

According to one or more embodiments of the present disclosure, example 3 provides the method of example 2, where the method further includes: creating a corresponding plug-in, so that the second application creates a plug-in object corresponding to the second application by loading the plug-in, where the virtual device sends the target video frame to the corresponding second application via the plug-in object.

According to one or more embodiments of the present disclosure, example 4 provides the method of example 2, where the sending the target video frame to the virtual device includes: decomposing the target video frame into multiple subframes; storing the multiple subframes into a shared memory, so that the virtual device reads the multiple subframes from the shared memory; where the virtual device is used to combine multiple subframes read to obtain the target video frame and send the target video frame to the second application.

According to one or more embodiments of the present disclosure, example 5 provides the method of any one of examples 1 to 4, where the performing the special effect processing on the current video frame according to the received special effect setting instruction, and generating the target video frame includes: identifying a target object in the current video frame; determining at least one target special effect to be superimposed according to the received special effect setting instruction; and superimposing the at least one target special effect to be superimposed with the target object, and generating the target video frame.

According to one or more embodiments of the present disclosure, example 6 provides the method of any one of examples 1 to 4, where the second application is used to send the received target video frame to at least one second terminal in real time, where the at least one second terminal receives and displays the target video frame through the second application.

According to one or more embodiments of the present disclosure, example 7 provides a video transmission method, applied to a virtual device in a first terminal, where the first terminal is installed with a first application and a second application. The method includes: acquiring multiple subframes sent by the first application, where the first application is used to decompose a target video frame into the multiple subframes; combining the multiple subframes to obtain the target video frame; and sending the target video frame to the second application, where the target video frame is generated by the first application performing special effect processing on a current video frame according to a received special effect setting instruction.

According to one or more embodiments of the present disclosure, example 8 provides the method of example 7, where the sending the target video frame to the second application includes: sending the target video frame to a plug-in object corresponding to the second application, so that the plug-in object sends the target video frame to the corresponding second application, where the plug-in object is created by loading a plug-in corresponding to the first application by the second application.

According to one or more embodiments of the present disclosure, example 9 provides the method of example 7, where the method further includes: sending the specified video frame to the second application when the multiple subframes sent by the first application are not obtained.

According to one or more embodiments of the present disclosure, example 10 provides the method of example 9, where the sending the specified video frame to the second application when the multiple subframes sent by the first application are not obtained includes: calculating whether a consecutive number of times that the multiple subframes are not acquired reaches a preset number of times, when the multiple subframes sent by the first application are not acquired; and taking the target video frame obtained by a latest combination as the specified video frame and sending the specified video frame to the second application, in the case that the number of consecutive times is less than the preset number of times.

According to one or more embodiments of the present disclosure, example 11 provides the method of example 10, where the sending the specified video frame to the second application when the multiple subframes sent by the first application are not obtained further includes: sending the preset video frame as the specified video frame to the second application, in the case that the number of consecutive times reaches the preset number of times.

According to one or more embodiments of the present disclosure, example 12 provides an electronic device, including: a storage apparatus and a processing apparatus, where a computer program is stored in the storage apparatus; and the processing apparatus is configured to execute the computer program in the storage apparatus to implement steps of the method according to any one of examples 1 to 11.

According to one or more embodiments of the present disclosure, example 13 provides a computer readable medium, where the medium stores a computer program which, when executed by a processing apparatus, implements steps of the method according to any one of examples 1 to 11.

According to one or more embodiments of the present disclosure, example 14 provides a computer program product including a computer program instruction, where the computer program instruction enables a computer to execute the steps of the method according to any one of examples 1 to 11.

According to one or more embodiments of the present disclosure, example 15 provides a computer program, where the computer program enables a computer to perform steps of the method according to any one of examples 1 to 11.

The above description is only a preferred embodiment of the present disclosure and an illustration of the applied technical principles. Those skilled in the art should understand that the disclosure scope involved in the present disclosure is not limited to the technical solutions formed by the specific combination of the above technical features, and should also cover other technical solutions formed by arbitrarily combining the above technical features or its equivalent features without departing from the above disclosed concept, for example, a technical solution formed by replacing the above features with the technical features disclosed in the present disclosure (but not limited to) with similar functions.

In addition, although operations are described in a particular order, this should not be understood as requiring that the operations be performed in the particular order shown or in a sequential order. Under certain circumstances, multitasking and parallel processing may be advantageous. Likewise, although the above discussion contains several specific implementation details, these should not be construed as limitations on the scope of the present disclosure. Certain features that are described in the context of a separate embodiment may also be implemented additively in a single embodiment. Rather, various features that are described in the context of a single embodiment may also be implemented in multiple embodiments separately or in any suitable sub-although operations are described in a particular order, this should not be understood as requiring that the operations be performed in the particular order shown or in a sequential order. Under certain circumstances, multitasking and parallel processing may be advantageous. Likewise, although the above discussion contains several specific implementation details, these should not be construed as limitations on the scope of the present disclosure. Certain features that are described in the context of a separate embodiment may also be implemented additively in a single embodiment. Rather, various features that are described in the context of a single embodiment may also be implemented in multiple embodiments separately or in any suitable sub-combination.

Although the subject matter has been described in a language specific to structural features and/or methodological logical actions, it is to be understood that the subject matter defined in the appended claims is not necessarily limited to the specific features or actions described above. Rather, the specific features and actions described above are merely example forms for implementing the claims. Regarding the apparatus in the above embodiments, the specific manner in which each module performs operations has been described in detail in the embodiments of the method, and will not be described in detail here.

What is claimed is:

1. A video transmission method, applied to a first application installed in a first terminal, wherein the first terminal is further installed with multiple second applications, and the method comprises:
   acquiring a current video frame;
   updating a set of special effects to be superimposed according to a received special effect setting instruction, performing special effect processing on the current video frame according to the updated set of special effects to be superimposed, and generating a target video frame to meet requirements of special effect processing of the multiple second applications, wherein the special effect setting instruction is input by a user during an operation of the first application through a special effect setting interface provided by the first application comprising a preview area and a special effect setting area, and multiple special effect setting components are set in the special effect setting area, wherein a specific form of the set of special effects to be superimposed is a form of an array; and
   sending the target video frame to each of the second applications;
   wherein the method further comprises:
   triggering the first terminal to create a virtual device; and
   sending the target video frame to the virtual device, so that the virtual device sends the target video frame to each of the second applications;
   creating a plug-in, so that each of the second applications creates a plug-in object corresponding to each of the second applications by loading the plug-in,
   wherein the virtual device sends the target video frame to each of the second applications via the corresponding plug-in object;
   wherein the sending the target video frame to the virtual device comprises:

decomposing the target video frame into multiple subframes;

storing the multiple subframes in a shared memory, so that the virtual device reads the multiple subframes from the shared memory;

wherein the virtual device is used to combine multiple subframes read to obtain the target video frame and send the target video frame to each of the second applications.

2. The method according to claim 1, wherein the performing the special effect processing on the current video frame according to the updated set of special effects to be superimposed, and generating the target video frame comprises:

identifying a target object in the current video frame;

determining at least one target special effect to be superimposed from the updated set of special effects to be superimposed; and superimposing the at least one target special effect to be superimposed with the target object, and generating the target video frame.

3. The method according to claim 2, wherein the determining at least one target special effect to be superimposed from the updated set of special effects to be superimposed comprises:

determining whether there are one or more groups of mutually exclusive sub special effects in the updated set of special effects to be superimposed according to special effect parameters of sub special effect to be superimposed in the updated set of special effects to be superimposed;

in response to determining that there are the one or more groups of mutually exclusive sub special effects, for each group of mutually exclusive sub special effects, selecting one of the mutually exclusive sub special effects as an enabled sub special effect according to priority parameters in special effect parameters of the mutually exclusive sub special effects;

determining the enabled sub special effect as the sub special effect to be superimposed; and determining the at least one target special effect to be superimposed according to the special effect parameters of the determined sub special effect to be superimposed.

4. The method according to claim 1, wherein each of the second applications is used to send the target video frame to at least one second terminal immediately after receiving the target video frame, wherein the at least one second terminal receives and displays the target video frame through the second application.

5. The method according to claim 1, wherein the plug-in object corresponding to each of the second applications comprises an identifier of the second application, and plug-in objects corresponding to different second applications are different, so that the virtual device sends the target video to each of the second applications corresponding to each plug-in object through each plug-in object.

6. The method according to claim 1, further comprises:

receiving video acquisition requests sent from the second applications; and wherein the current video frame is a current video frame in running processes of the second applications.

7. The method according to claim 1, wherein each special effect setting component comprises multiple sub special effect setting components, in a case where it is detected that the user clicks a sub special effect setting component, the received special effect setting instruction comprises a special effect adding instruction, and the updating the set of special effects to be superimposed according to the received special effect setting instruction comprises:

adding special effect parameters of a sub special effect corresponding to the sub special effect setting component into the set of special effects to be superimposed according to the special effect adding instruction;

after adding the special effect parameters of the sub special effect corresponding to the sub special effect setting component into the set of special effects to be superimposed, in a case where it is detected that the user clicks the sub special effect setting component, the received special effect setting instruction comprises a special effect cancellation instruction, and the updating the set of special effects to be superimposed according to the received special effect setting instruction comprises:

deleting the special effect parameters of the sub special effect corresponding to the sub special effect setting component from the set of special effects to be superimposed according to the special effect cancellation instruction.

8. The method according to claim 7, wherein the special effect parameters of the sub special effect comprise mutually exclusive parameters, priority parameters and addition time parameters, wherein the mutually exclusive parameters comprise identifications of other sub special effects mutually exclusive with the sub special effect.

9. A non-transitory computer readable medium, wherein the medium stores a computer program which, when executed by a processing apparatus, implements steps of the method according to claim 1.

10. A video transmission method, applied to a virtual device in a first terminal, wherein the first terminal is installed with a first application and multiple second applications, and the method comprises:

acquiring multiple subframes sent by the first application, wherein the first application is used to decompose a target video frame into the multiple subframes;

combining the multiple subframes to obtain the target video frame; and sending the target video frame to each of the second applications, wherein the target video frame is generated by the first application performing special effect processing on a current video frame according to a set of special effects to be superimposed to meet requirements of special effect processing of the multiple second applications, wherein the set of special effects to be superimposed is updated according to a received special effect setting instruction, wherein the special effect setting instruction is input by a user during an operation of the first application through a special effect setting interface provided by the first application comprising a preview area and a special effect setting area, and multiple special effect setting components are set in the special effect setting area, wherein a specific form of the set of special effects to be superimposed is a form of an array;

wherein the sending the target video frame to each of the second applications comprises:

sending the target video frame to a plug-in object corresponding to each of the second applications, so that the corresponding plug-in object sends the target video frame to each of the second applications, wherein the corresponding plug-in object is created by loading a plug-in corresponding to the first application by each of the second applications.

11. The method according to claim 10, wherein the method further comprises:
sending a specified video frame to each of the second applications when the multiple subframes sent by the first application are not obtained.

12. The method according to claim 11, wherein the sending the specified video frame to each of the second applications when the multiple subframes sent by the first application are not obtained comprises:
calculating whether a consecutive number of times that the multiple subframes are not acquired reaches a preset number of times, when the multiple subframes sent by the first application are not acquired; and
taking the target video frame obtained by a latest combination as the specified video frame and sending the specified video frame to each of the second applications, in the case that the number of consecutive times is less than the preset number of times.

13. The method according to claim 12, wherein the sending the specified video frame to each of the second applications when the multiple subframes sent by the first application are not obtained further comprises:
sending a preset video frame as the specified video frame to each of the second applications, in the case that the number of consecutive times reaches the preset number of times.

14. An electronic device, comprising:
at least one processor;
a memory storing instructions and connected with the at least one processor;
wherein the instructions, when executed by the at least one processor, cause the at least one processor to perform the method according to claim 10.

15. A non-transitory computer readable medium, wherein the medium stores a computer program which, when executed by a processing apparatus, implements steps of the method according to claim 10.

16. An electronic device, applied to a first application installed in a first terminal, wherein the first terminal is further installed with multiple second applications, and the electronic device comprises:
at least one processor;
a memory storing instructions and connected with the at least one processor;
wherein the instructions, when executed by the at least one processor, cause the at least one processor to:
acquire a current video frame;
update a set of special effects to be superimposed according to a received special effect setting instruction, perform special effect processing on the current video frame according to the updated set of special effects to be superimposed, and generate a target video frame to meet requirements of special effect processing of the multiple second applications, wherein the special effect setting instruction is input by a user during an operation of the first application through a special effect setting interface provided by the first application comprising a preview area and a special effect setting area, and multiple special effect setting components are set in the special effect setting area, wherein a specific form of the set of special effects to be superimposed is a form of an array; and
send the target video frame to each of the second applications;
wherein the instructions further cause the at least one processor to:
trigger the first terminal to create a virtual device; and
send the target video frame to the virtual device, so that the virtual device sends the target video frame to each of the second applications;
create a plug-in, so that each of the second applications creates a plug-in object corresponding to each of the second applications by loading the plug-in,
wherein the virtual device sends the target video frame to each of the second applications via the corresponding plug-in object;
wherein the instructions further cause the at least one processor to:
decompose the target video frame into multiple subframes;
store the multiple subframes in a shared memory, so that the virtual device reads the multiple subframes from the shared memory;
wherein the virtual device is used to combine multiple subframes read to obtain the target video frame and send the target video frame to each of the second applications.

17. The device according to claim 16, wherein the instructions further cause the at least one processor to:
identify a target object in the current video frame;
determine at least one target special effect to be superimposed from the updated set of special effects to be superimposed; and
superimpose the at least one target special effect to be superimposed with the target object, and generate the target video frame.

18. The device according to claim 16, wherein each of the second applications is used to send the target video frame to at least one second terminal immediately after receiving the target video frame,
wherein the at least one second terminal receives and displays the target video frame through the second application.

19. The device according to claim 16, wherein the plug-in object corresponding to each of the second applications comprises an identifier of the second application, and plug-in objects corresponding to different second applications are different, so that the virtual device sends the target video to each of the second applications corresponding to each plug-in object through each plug-in object.

20. The device according to claim 16, wherein the instructions further cause the at least one processor to:
receive video acquisition requests sent from the second applications; and
wherein the current video frame is a current video frame in running processes of the second applications.

* * * * *